Jan. 30, 1962

R. C. GOERTZ ET AL 3,018,980

VEHICLE FOR SLAVE ROBOT

Filed Nov. 3, 1959

INVENTORS
Raymond C. Goertz
John F. Lindberg
BY

Attorney

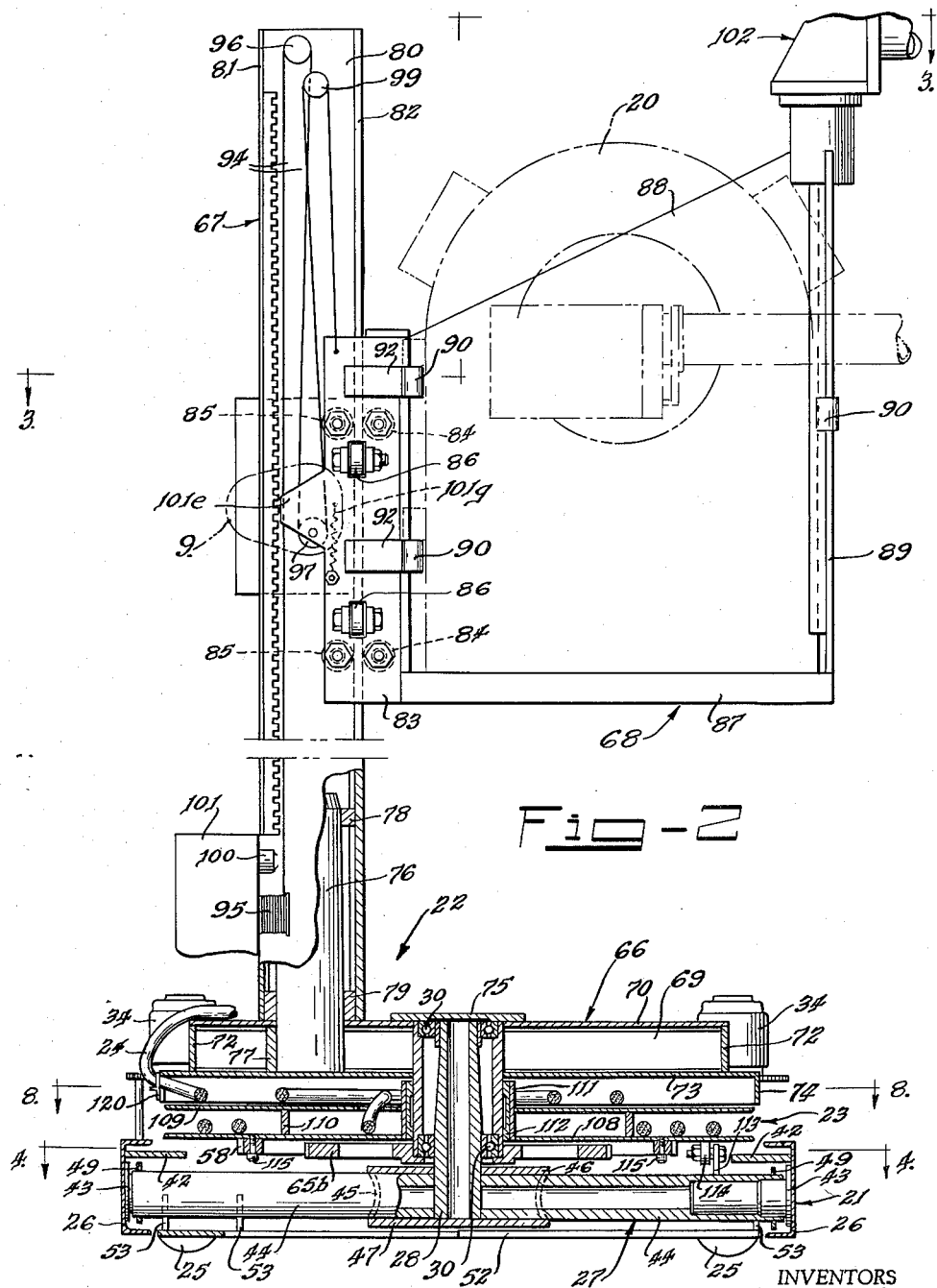

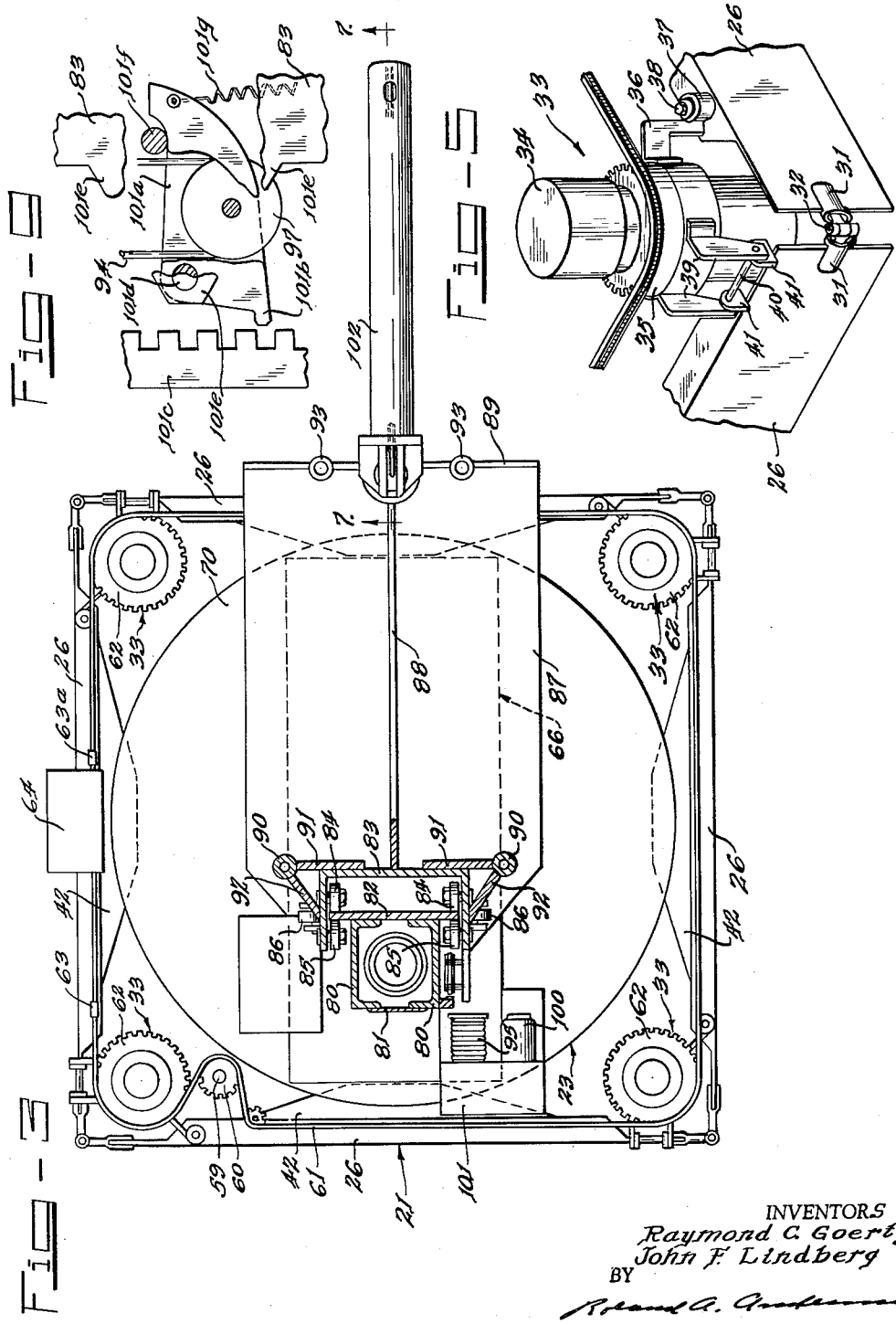

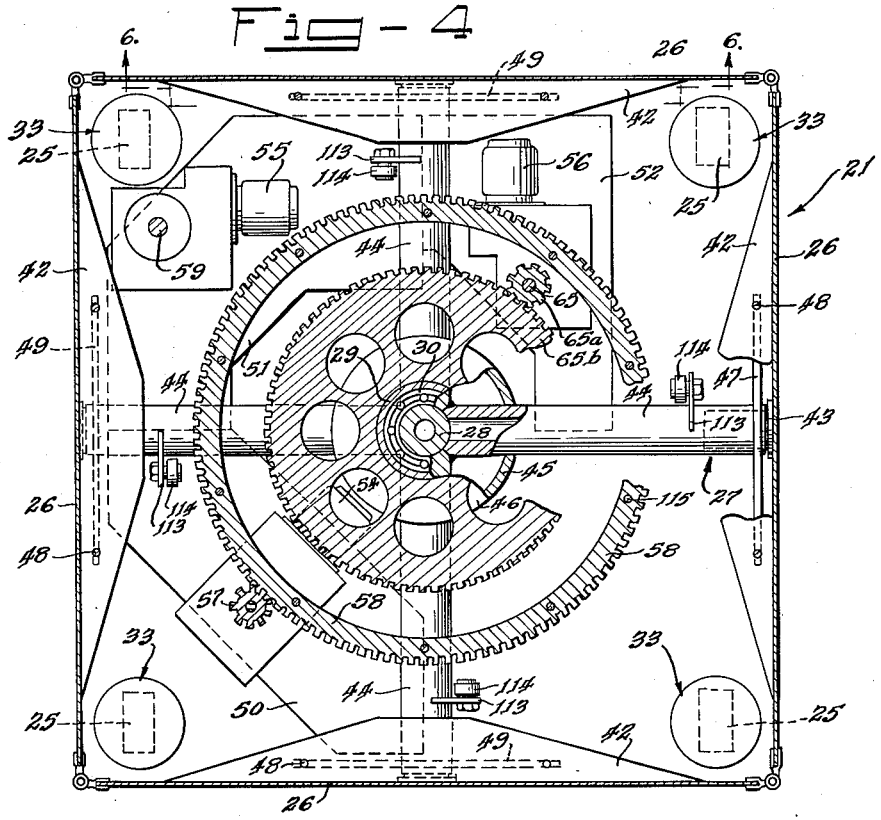
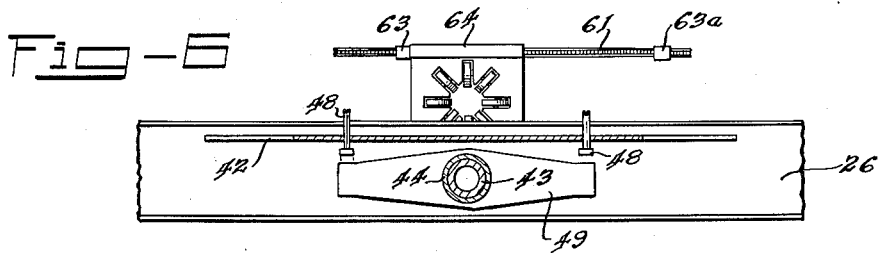
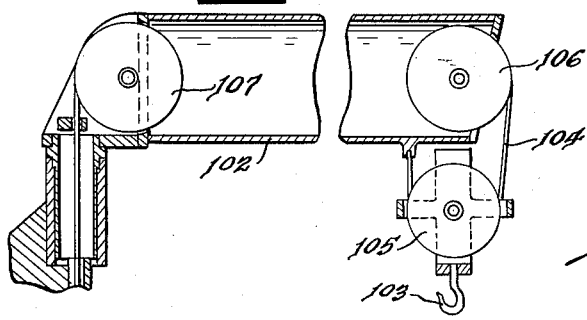

United States Patent Office 3,018,980
Patented Jan. 30, 1962

3,018,980
VEHICLE FOR SLAVE ROBOT
Raymond C. Goertz, Downers Grove, and John F. Lindberg, Elmhurst, Ill., assignors to the United States of America as represented by the United States Atomic Energy Commission
Filed Nov. 3, 1959, Ser. No. 850,744
1 Claim. (Cl. 242—86.5)

This invention relates to a vehicle for a remote-control manipulator. More particularly, the invention relates to a vehicle for the slave unit of an electrical manipulator and to an arrangement for handling an electrical cable that connects the slave unit with a master unit.

Goertz et al. Patent 2,846,084, dated August 5, 1958, relates to a remote-control manipulator in which there are electrical connections between the master unit and slave unit. One of the outstanding advantages of such a manipulator is that it may be operated with master and slave units at various distances from one another and at different angles with respect to one another. Accordingly, it becomes possible and desirable to carry the slave unit on a vehicle that shifts the slave unit about in various positions and angles.

An object of the present invention is to provide a vehicle for a manipulator enabling it to be at different locations and angles.

A further object is to provide on a manipulator an electrical-cable reel that reels in and out the cable as the manipulator moves toward and away from a power source. Thus the manipulator vehicle will not be hampered by reeled-out cable while moving about.

Other objects will appear from the description that follows when taken in connection with the attached drawings in which:

FIG. 2 is an elevational view, partly in section, of the manipulator vehicle;

FIG. 3 is a sectional view taken on the line 3—3 of FIG. 2 and shows the mounting for vertically adjustable support for the manipulator;

FIG. 4 is a sectional view taken on the line 4—4 of FIG. 2 and shows the wheeled framework of the manipulator vehicle as well as the drives for rotating the carriage of the vehicle and the reel for the manipulator cable;

FIG. 5 is a fragmentary perspective view showing how a vehicle driving wheel is connected to the vehicle framework;

FIG. 6 is a sectional view taken on the line 6—6 of FIG. 4 and shows how tilting of the vehicle framework is controlled and how movement of the sprocket chain steering the vehicle wheels is limited;

FIG. 7 is a sectional view taken on the line 7—7 of FIG. 3 and shows the crane carried by the manipulator vehicle;

FIG. 9 is a fragmentary view, with portions cut away, of the parts in the enclosure 9 in FIG. 2.

Figure 1:
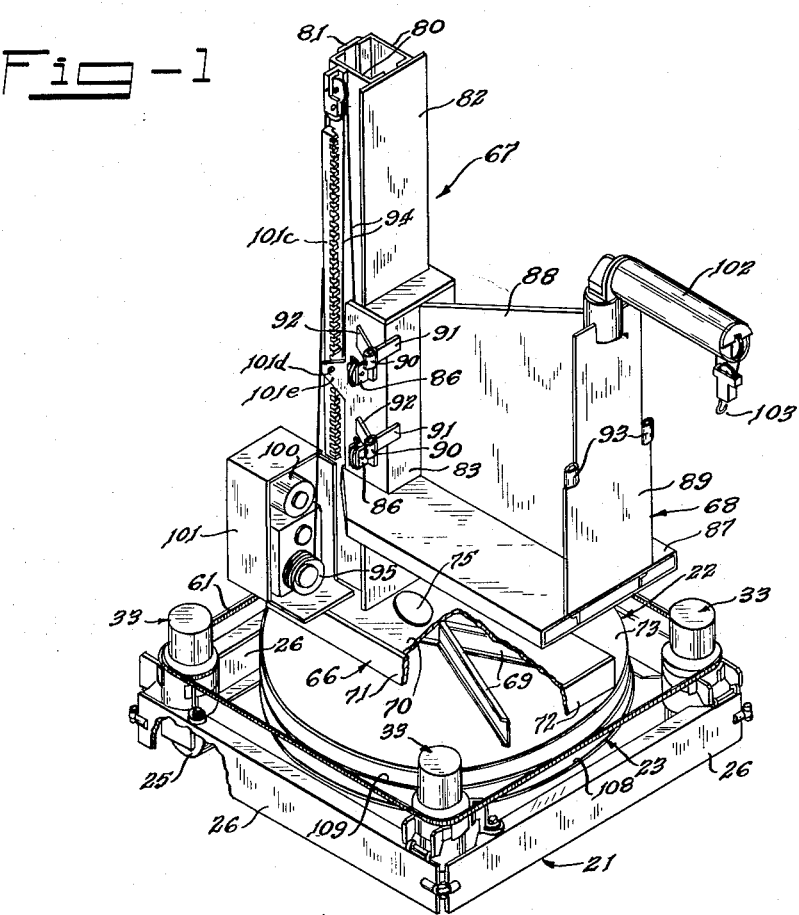
FIG. 1 is a perspective view, with parts broken away, of the manipulator vehicle of the present invention.

As shown in FIGS. 1 and 2, the vehicle of the present invention is adapted to carry two slave units 20, which are generally like those disclosed and claimed in Goertz et al. Patent 2,846,084, dated August 5, 1958, and which are specifically like those disclosed and claimed in Goertz et al. Patent No. 2,978,118, dated April 4, 1961. The vehicle comprises essentially a mobile framework 21, a rotatable carriage 22 supported on the framework 21, and a device 23 for reeling in and out an electrical cable 24 as the manipulator vehicle moves toward and away from an opening in the wall of a chamber where the manipulator vehicle is located, through which opening the cable passes. This cable opening in the chamber wall will be referred to hereafter as a power source.

As shown in FIG. 4, the mobile framework 21 comprises four steerable driving wheels 25, four side pieces 26 to which the wheels 25 are connected, an X-member 27 upon which the side pieces are pivoted, and a post 28 secured to and extending upwardly from the center of the X-member 27. The carriage 22 has a depending tubular section 29 which is journalled on the post 28 through bearings 30. The post 28, tubular section 29, and bearings 30 provide the rotatable mounting of the carriage 22 on the mobile framework 21.

As shown in FIGS. 3, 4, and 5, the side pieces 26 are loosely connected at their ends through parts 31 and pivot pins 32. The parts 31 are secured to the ends of the side pieces 26, and the pins 32 loosely connect the parts 31. Each wheel 25 forms part of a unit 33 also including an electric motor 34 for driving the wheel 25 through a shaft and gears, not shown, and a casing 35. The casing 35 is loosely connected with one side piece 26 through a single-leg bracket having a large eye or loop 37 loosely receiving a bolt 38 attached to the side piece 26. The casing 35 is connected to the adjacent side piece 26 by means of a double-leg bracket 39 in which is tightly fitted a pivot pin 40 which is carried in tight openings in ears 41 secured to the side piece 26. The spacing of the ears 41 is somewhat less than the spacing of the legs of the bracket 39 so that the casing may move along the side piece 26 to which the ears 41 are attached. As shown in FIGS. 2 and 4, each side piece 26 is channel-shaped and carries a reinforcing member 42. At a mid-point in the length of each side piece 26 a spindle or stub shaft 43 is secured which is rotatably mounted in the outer end of a tube 44, which is one of four such tubes welded to one another at their inner ends to make up the X-member 27. In addition to the 4 tubes 44, the X-member 27 includes a short cylinder 45 through which the tubes 44 extend. The cylinder 45 has a top 46 and a bottom 47. The post 28 extends through the top 46 and abuts the bottom 47.

As shown in FIG. 6, each side piece 26 may pivot about the axis of the associated tube 44 of the X-member 27 by virtue of the mounting of the spindle 43 in the tube 44. Such pivoting of the side pieces 26 about a tube 44 of the X-member 27 permits the driving wheels 25 to move up and down with respect to the X-member 27 and thus allows the manipulator vehicle to move about over uneven ground or floor.

As shown in FIG. 6, pivoting of each side piece 26 with respect to the associated tube 44 of the X-member 27 is limited by engagement of adjustably positioned stops 48 threaded through the reinforcing member 42, and a wing member 49 secured to the tube 44.

As shown in FIGS. 2 and 4, plates 50, 51, and 52, carried by and below the X-member 27 by hangers 53, support, respectively, motors 54, 55, and 56. Motor 54 drives a pinion 57 meshing with a driving gear 58 for the reeling device 23. Motor 5 drivers a shaft 59 which, as shown in FIG. 3, is secured to a sprocket 60 driving a sprocket chain 61, in turn driving sprockets 62 on the wheel units 33 for conjointly steering the driving wheels 25. As shown in FIG. 6, steering movement of the driving wheels 25 is limited in both directions by engagement of stops 63 and 63a on chain 61 with opposite sides of a cable guide 64. Carriage 22 is rotated by the motor 56, driving it through a shaft 65, a pinion 65a secured to the shaft 65, and a gear 65b meshing with the pinion 65a secured to the lower end of the tubular section 29.

As shown in FIGS. 1 and 2, the carriage 22 comprises a base 66, a vertical member 67 secured thereto, and a vertically adjustable support 68 on which the slave units 20 are directly mounted. The base 66 comprises essentially four I-beams 69 which are welded to one another in pairs and also to the tubular structure 29 so as to extend therefrom in a narrow X-shape. The I-beams 69 are covered by a top plate 70, side plates 71, and end plates 72 and rest on a circular plate 73, all these plates being welded to the I-beams 69. A depending circular retaining rim 74, which is secured to the periphery of the circular plate 73, forms part of the reeling device 23, limiting outward movement of the cable 24 in the reeling device. The tubular section 29 projects into an opening in the top plate 70 which is closed by a cover 75.

The base 66 carries a king pin 76 (FIG. 2) which is circular and tapering and is secured to two of the I-beams 69 and to a cross piece 77 secured to these two I-beams. The king pin 76 receives the lower end of the vertical member 67, being engaged by rings 78 and 79 secured to the interior of the vertical member 67. The vertical member is generally rectangular in cross section and is composed of two opposed channels 80, a narrow strip 81 welded to the channels 80 and a wide strip 82 also welded to the channels 80 and projecting therebeyond to form flanges or tracks on which the support 68 rides for vertical movement. As shown in FIGS. 1 and 3, the support 68 has a channel 83 on each side of which are mounted an upper set and a lower set of rollers 84, 85, and 86. The rollers 84 and 85 engage the opposite sides of the projecting portions of the wide strip 82, and the rollers 86 project through openings in the sides of the channel 83 into engagement with edges of the wide strip 82.

As shown in FIGS. 1, 2, and 3, the support 68 comprises, in addition to the channel 83, a hollow reinforced box-like structure 87 extending horizontally from the lower end of the channel 83, a vertical web 88 projecting perpendicularly from both the structure 87 and the base of the channel 83, and another vertical web 89, perpendicular to the structure 87 and the web 88 and spaced from the channel 83. As shown in FIGS. 1 and 3, there are provided two pairs of mountings 90 for the two slave units 20. The mountings 90 of one pair are secured to the channel 83 beyond opposite sides thereof by means of straps 91 and 92. In each pair, the mountings 90 are vertically aligned and spaced from one another so that slave units 20 may pivot on the mountings 90 about a vertical axis away from the vertical web 88, when access is to be had to the side of the slave unit normally facing the web 88. The slave units 20 are held against the above pivotal movement by pins, not shown, that are carried by the slave units and inserted in tubular portions 93 formed on the vertical web 89. The support 68 and, with it, the slave units 20 are vertically adjusted along the vertical member 67 by means of a cable 94 and a reel 95 about which the cable 94 is wound. The cable 94 extends from a connection with the channel 83 of the support 68, upwardly to a pulley 96 near the top of the vertical member 67, thence downwardly to a pulley 97, thence upwardly to a pulley 99 on the upper end of the vertical member 67, and thence downwardly to the reel 95. The reel 95 and a motor 100 which drives it are carried by a housing structure 101 mounted on the base 66. If the cable breaks, the adjustable support 68 is kept from falling by a safety member 101a (FIG. 9) having a tooth or projection 101b engaging a toothed rack 101c secured to the vertical member 67. The safety member 101a is pivoted at 101d on a wing 101e on channel 83 and carries the pulley 97 over which the cable 94 goes. Engagement of the pulley 97 by the cable 94 holds the safety member 101a against a stop 101f on channel 83 and keeps the tooth 101b out of engagement with the rack 101c. When the cable 94 breaks, a tension spring 101g, which is connected to the safety member 101a and the channel 83, swings the safety member 101a about pivot 101d to engage the tooth 101b with the rack 101c.

As shown in FIGS. 1, 2, and 7, a crane 102 is carried by the support 68 on the vertical webs 88 and 89. The crane 102 has a hook 103 which is raised and lowered by a cable 104 running over pulleys 105, 106, and 107. The purpose of the crane 102 is to bring objects to be manipulated to the level of the slave units 20.

Figure 8:
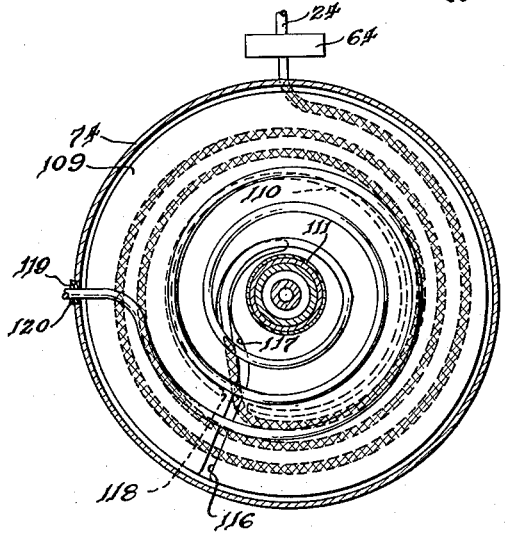
FIG. 8 is a sectional view taken on the line 8—8 of FIG. 2 and shows how the manipulator cable is wound on the reel.

Reference is now made to FIGS. 2 and 8 for a very important part of the present invention, namely, the cable-reeling device 23. In addition to the driving gear 58 and the circular rim 74 previously mentioned, the reeling device 23 comprises a lower plate 108, an upper plate 109 spaced therefrom, a hub 110 of relatively large diameter secured to and between plates 108 and 109, and hub 111 of small diameter extending upwardly from the upper plate 109 into immediate proximity with the circular plate 73 of the base 66. The upper and lower plates 108 and 109 are of about the same diameter as the circular rim 74, which has its lower edge directly adjacent the upper plate 109 at its entire periphery. The small hub 111 extends not only upwardly from the upper plate 109 but downwardly to the lower plate 108, being secured to both plates and cooperating with a bushing 112 mounted within it to journal the reeling device 23 on the tubular section 29. The reeling device 23 is vertically supported on the X-member 27 by means of brackets 113 secured thereto and rollers 114 carried by the brackets and engaging the lower plate 108. The driving gear 58 is secured to the lower side of the lower plate by screws 115.

As shown in FIG. 8, the upper plate 109 has a slot 116 which extends generally radially inwardly from the periphery and terminates in a spiral tail 117 which is inward of the large hub 110 and extends almost to the small hub 111. The large hub 110 has a relatively narrow opening 118 coincident with the slot 116 in the upper plate 109. The electrical cable 24 for operating the manipulator extends through the cable guide 64 and thence clockwise in a coil between plates 108 and 109 to the opening 118 in the large hub 110 through which it passes. Thence the cable 24 extends through the spiral tail 117 of the slot 116 in the upper plate 109 and thence in a clockwise direction in a coil between the upper plate 109 and the circular plate 73 to a recess 119 in the rim 74. The cable 24 is retained against lengthwise movement at the rim recess 119 by means in the form of a collar 120 secured in the recess 119, and extends upwardly from this recess to the top of the base 66, where it divides or splits in a manner, not shown, to go to the various parts to be operated electrically such as the slave units 20, the crane 102, the support-elevating motor 100, the wheel-driving motors 34, the wheel-steering motor 55, the carriage-rotating motor 56, and the reel-rotating motor 54. The spiral tail 117 of the slot 116 and the upper plate 109 also extends in the same direction, namely, clockwise, as the portions of the cable 24 between the guide 64 and the opening 118 and the large hub 110 and between the tail 117 and the recess 119 in the rim 74.

The length of the upper cable coil between the recess 119 in rim 74 and the slot 116 in the upper plate 109 tends to remain fairly constant. When the carriage 22 is rotated in a direction to move the rim recess 119 clockwise, as viewed in FIG. 8, the rim recess 119 moves clockwise with respect to the plate slot 116 and the upper coil between the rim recess 119 and the plate slot 116 tightens and moves radially inwardly toward the small hub 111, because of increase in the total angle of wrap of the said coil. If rotational movement of the carriage 22 is in the opposite direction, the portion of the cable coil between the rim recess 119 and plate slot 116 tends to move outwardly toward the retaining rim 74, because of decrease in the total angle of wrap of the coil. The same things can happen to the upper cable coil when the reeling device 23 is being rotated in one direction or the other as the vehicle moves toward or away from the source of power supplied to the cable 24. When the vehicle is moving away from the power source, the cable 24 is reeled out through the guide 64 by counterclockwise rotation, as viewed in FIG. 8, of the reeling device 23, and more particularly, the upper plate 109 thereof through which the cable passes in the slot 116. When this is happening, the total angle of wrap of upper coil of the cable which is between the slot 116 and the upper plate 109 and the rim recess 119 in the rim 74 increases, and so the upper cable moves toward the small hub 111. When the vehicle is moving toward the source of power, the cable 24 is reeled in by clockwise rotation of the reeling device 23. Such clockwise rotation decreases the total angle of wrap of the upper coil of the cable between the plate slot 116 and the rim recess 119, so that the upper coil moves outwardly toward the rim 74. Because the tail 117 on the plate slot 116 extends in the same direction, namely, clockwise, as the portions of the cable extend from the guide 64 to the plate slot 116 and thence to the rim recess 119, the upper coil of the cable 24 can move radially outwardly or inwardly in the spiral tail 117 and thus be enabled to expand or contract as required.

The reel motor 54 is always electrically driven in the direction required for rotation of the driving gear 58 in a clockwise direction as viewed in FIG. 4, so that the reeling device 23 is always urged in a direction required for reeling in the cable 24 through the guide 64, as shown in FIG. 8. The reel motor 54 is preferably a torque motor, i.e., a motor that has constant torque at any speed and at a stall, and can be backed or reversed by external mechanical forces in a direction opposite to that in which the motor is electrically driven. Thus when the vehicle moves toward the cable source, the motor 54 rotates the reeling device 23 so as to reel in the cable 24 therein and shorten the amount of cable 24 between the guide 64 and the power source. When the vehicle is stationary, the motor 54 is stalled even though electrically urged in the direction needed for reeling in the cable 24. When the vehicle moves away from the power source, the required increase in the length of the cable 24 between the power source and the cable guide 64 reverses the reeling device 23 and the motor 54 so that it rotates in the direction opposite to that in which it is electrically urged.

The intention is to limit the invention only within the scope of the appended claim.

What is claimed is:

Apparatus comprising a first plate, a second plate parallel to and spaced from the first plate and having a slot extending generally radially inwardly from the periphery and terminating in a spiral tail, a relatively large hub secured to and between the plates in spaced relation to the peripheries thereof and having a relatively narrow opening coinciding with a mid-portion of the slot in the second plate, a relatively small hub extending from the side of the second plate away from the first plate, a circular rim having a recess and closely approaching the second plate at its entire periphery on the side of the second plate away from the first plate, means mounted at the recess in the rim preventing lengthwise movement of the cable, a cable guide positioned adjacent the periphery of the first plate, an electrical cable extending from a power source through the cable guide, thence in a coil about the large hub, thence through the opening in the large hub and the slot in the second plate, thence in a coil about the small hub to and through the recess in the rim, the cable winding in a certain direction from the guide to the slot in the second plate and in the same direction from said slot to the recess in the rim, the spiral tail of the slot in the second plate extending in the said same direction, and means for urging the plates and the hubs to rotate at all times in the said certain direction with respect to the circular rim and cable guide about an axis coincident with that of the rim and means mounting the rim for angular movement about its own axis with respect to the cable guide so as to cause the cable-holding means at the rim recess also to be angularly movable with respect to the cable guide.

References Cited in the file of this patent

UNITED STATES PATENTS

| | | |
|---|---|---|
| 1,120,572 | Waxbom | Dec. 8, 1914 |
| 1,446,410 | Bennett et al. | Feb. 20, 1923 |
| 2,438,515 | Mohler | Mar. 30, 1948 |
| 2,515,805 | Simmons | July 18, 1950 |
| 2,707,598 | Paget | May 3, 1955 |

FOREIGN PATENTS

| | | |
|---|---|---|
| 683,181 | Great Britain | Nov. 26, 1952 |
| 777,728 | France | Dec. 5, 1934 |